(12) United States Patent
Hsu

(10) Patent No.: US 11,283,465 B2
(45) Date of Patent: Mar. 22, 2022

(54) NETWORK DATA PREDICTION METHOD, NETWORK DATA PROCESSING DEVICE AND NETWORK DATA PROCESSING METHOD

(71) Applicant: REALTEK SEMICONDUCTOR CORPORATION, Hsinchu (TW)

(72) Inventor: Chao-Yuan Hsu, Taipei (TW)

(73) Assignee: REALTEK SEMICONDUCTOR CORPORATION, Hsinchu (TW)

(*) Notice: Subject to any disclaimer, the term of this patent is extended or adjusted under 35 U.S.C. 154(b) by 0 days.

(21) Appl. No.: 17/000,563

(22) Filed: Aug. 24, 2020

(65) Prior Publication Data
US 2020/0389184 A1 Dec. 10, 2020

Related U.S. Application Data

(62) Division of application No. 16/251,685, filed on Jan. 18, 2019, now Pat. No. 10,797,726.

(30) Foreign Application Priority Data

Feb. 12, 2018 (TW) .................................. 107104854

(51) Int. Cl.
*H03M 13/09* (2006.01)
*H04L 1/00* (2006.01)
(Continued)

(52) U.S. Cl.
CPC ......... *H03M 13/096* (2013.01); *H03M 13/09* (2013.01); *H04L 1/005* (2013.01);
(Continued)

(58) Field of Classification Search
CPC ... H03M 13/096; H03M 13/09; H04L 1/0061; H04L 9/3242; H04L 1/005; H04L 65/4076; H04L 1/0057
See application file for complete search history.

(56) References Cited

U.S. PATENT DOCUMENTS

2005/0278606 A1   12/2005  Richardson et al.
2006/0133483 A1*  6/2006   Park ........................ H04N 19/36
                                                  375/240.08
(Continued)

OTHER PUBLICATIONS

Hagenauer, "Iterative Decoding of Binary Block and Convolutional Codes", IEEE Transactions on information theory, vol. 42, No. 2, pp. 429-445, Mar. 1996, IEEE.

*Primary Examiner* — Thien Nguyen
(74) *Attorney, Agent, or Firm* — WPAT, PC

(57) ABSTRACT

A network data prediction method applied to a device that implements an OSI model is provided. The device communicates with a target network device that implements the OSI model. The method includes the following steps: generating a transmission data according to a communication protocol of a first abstraction layer, the transmission data being able to be processed by a first peer abstraction layer of the target network device, and the first peer abstraction layer corresponding to the first abstraction layer and obeying the communication protocol; generating a predicted data according to the communication protocol and the transmission data; and transmitting the transmission data and the predicted data to a second abstraction layer.

8 Claims, 9 Drawing Sheets

(51) Int. Cl.
*H04L 29/06* (2006.01)
*H04L 9/32* (2006.01)
*H04L 65/611* (2022.01)

(52) U.S. Cl.
CPC .......... *H04L 1/0057* (2013.01); *H04L 1/0061* (2013.01); *H04L 9/3242* (2013.01); *H04L 65/4076* (2013.01)

(56) References Cited

U.S. PATENT DOCUMENTS

2010/0325255 A1* 12/2010 Cheung ................ A63F 13/332
  709/223
2015/0358641 A1* 12/2015 Choi ...................... H04N 19/44
  375/240.13

* cited by examiner

```
MasterInformationBlock-NB ::=       SEQUENCE {
    systemFrameNumber-MSB-r13           BIT STRING (SIZE (4)),
    hyperSFN-LSB-r13                    BIT STRING (SIZE (2)),
    schedulingInfoSIB1-r13              INTEGER (0..15),
    systemInfoValueTag-r13              INTEGER (0..31),
    ab-Enabled-r13                      BOOLEAN,
    operationModeInfo-r13               CHOICE {
        inband-SamePCI-r13                  Inband-SamePCI-NB-r13,
        inband-DifferentPCI-r13             Inband-DifferentPCI-NB-r13,
        guardband-r13                       Guardband-NB-r13,
        standalone-r13                      Standalone-NB-r13
    },
    spare                               BIT STRING (SIZE (11))
}
```

FIG. 8

NETWORK DATA PREDICTION METHOD, NETWORK DATA PROCESSING DEVICE AND NETWORK DATA PROCESSING METHOD

BACKGROUND OF THE INVENTION

1. Field of the Invention

The present invention generally relates to the Internet, and, more particularly, to the Internet of Things (IoT).

2. Description of Related Art

A terminal device on the Internet may fail to receive data due to insufficient signal strength or poor signal quality. Depending on the types of data to be received, failing to receive data may lead to different consequences. Taking the narrow-band Internet of Things (NB-IoT) as an example:
(1) When receiving the data that an evolved Node B (eNB) repeatedly transmits (such as Narrowband Physical Downlink Shared Channel (NPDSCH) or Downlink Control Information (DCI)) fails, the terminal device must continue to turn on or enable the circuits (such as a receiver and a decoder) in the subsequent processes, resulting in more power consumption of the terminal device.
(2) When receiving the data that is not repeatedly transmitted by the eNB fails, the terminal device may need to restart a process greater than case (1), causing a larger communication delay and greater power consumption. For example, when the terminal device fails to receive the system information block (SIB), it has to wait for a longer period before it can try again. For another example, when the terminal device fails to receive a transport block (TB) carrying user plane data, it has to wait for the retransmission of a hybrid automatic repeat request (HARQ) or radio link control (RLC).

In addition to the above-discussed situations where the terminal device may suffer communication delay and increased power consumption, being unable to receive the signal for a certain period of time may hinder the terminal device from completing the task.

SUMMARY OF THE INVENTION

In view of the issues of the prior art, an object of the present invention is to provide a network data prediction method, a network data processing device, and a network data processing method to improve the performance of the network terminal device, so as to make an improvement to the prior art.

A network data processing method applied to a device that implements an Open Systems Interconnection model (OSI model) is provided. The method includes the following steps: generating a first data block and a second data block according to the OSI model; processing the first data block based on an error detection method to generate a first check code; encoding the first data block and the first check code to generate a first network data; transmitting the first network data; receiving a second network data, the second network data including a second check code; performing decoding based on a portion of the second data block and a portion of the second network data to thereby generate a target data; and checking the target data according to the second check code.

A network data processing device is also provided. The network data processing device includes a data processing circuit, an error detection data generating circuit, an encoding circuit, a data transceiving circuit, a decoding circuit. The data processing circuit is configured to generate a first data block and a second data block according to an OSI model. The error detection data generating circuit is coupled to the data processing circuit and configured to process the first data block based on an error detection method to generate a first check code. The encoding circuit is coupled to the error detection data generating circuit and configured to encode the first data block and the first check code to generate a first network data. The data transceiving circuit is coupled to the encoding circuit and configured to transmit the first network data and receive a second network data, the second network data including a second check code. The decoding circuit, coupled to the data processing circuit and the data transceiving circuit, is configured to perform decoding based on a portion of the second data block and a portion of the second network data to thereby generate a target data and to check the target data according to the second check code.

A network data prediction method applied to a device that implements an OSI model is provided. The device communicates with a target network device that implements the OSI model. The method includes the following steps: generating a transmission data according to a communication protocol of a first abstraction layer, the transmission data being able to be processed by a first peer abstraction layer of the target network device, and the first peer abstraction layer corresponding to the first abstraction layer and obeying the communication protocol; generating a predicted data according to the communication protocol and the transmission data; and transmitting the transmission data and the predicted data to a second abstraction layer.

The network data prediction method, the network data processing device, and the network data processing method of the present invention improve decoding performance by predicting data to be received. Compared with the prior art, this invention facilitates the early termination of the decoding process, so that the network device has lower power consumption and a larger receiving range.

These and other objectives of the present invention no doubt become obvious to those of ordinary skill in the art after reading the following detailed description of the preferred embodiments with reference to the various figures and drawings.

BRIEF DESCRIPTION OF THE DRAWINGS

FIG. 8 illustrates a data structure of a broadcast packet corresponding to the Narrowband Master Information Block (MIB-NB) (MasterInformationBlock-NB) of the NB-IoT.

DETAILED DESCRIPTION OF THE EMBODIMENTS

Figure 1:
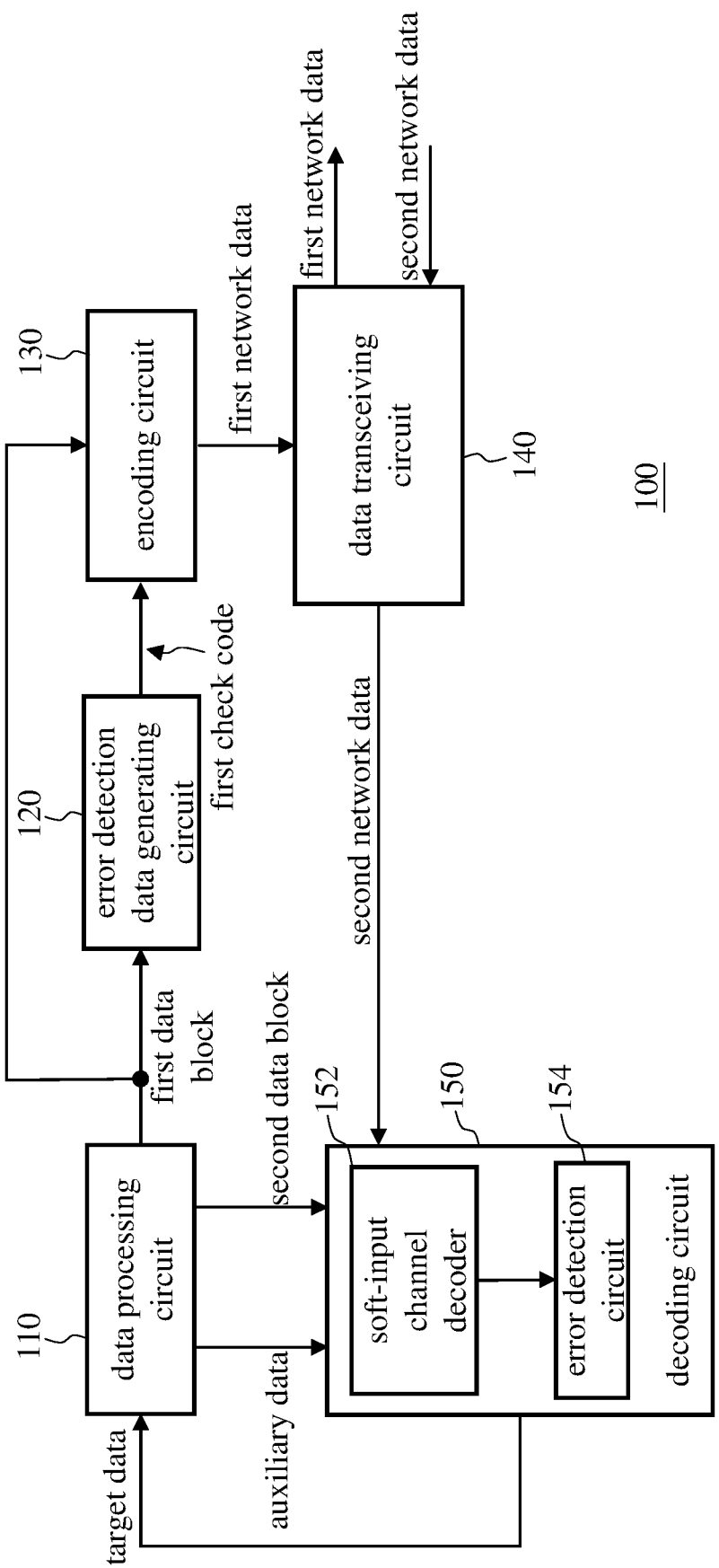
FIG. 1 illustrates a functional block diagram of a network data processing device according to an embodiment of the present invention.

The following description is written by referring to terms of this technical field. If any term is defined in this specification, such term should be explained accordingly. In addition, the connection between objects or events in the below-described embodiments can be direct or indirect provided that these embodiments are practicable under such connection. Said "indirect" means that an intermediate object or a physical space exists between the objects, or an intermediate event or a time interval exists between the events.

The disclosure herein includes a network data prediction method, a network data processing device, and a network data processing method. On account of that some or all elements of the network data processing device could be known, the detail of such elements is omitted provided that such detail has little to do with the features of this disclosure and this omission nowhere dissatisfies the specification and enablement requirements. Some or all of the processes of the network data prediction method and the network data processing method may be implemented by software and/or firmware. A person having ordinary skill in the art can choose components or steps equivalent to those described in this specification to carry out the present invention, which means that the scope of this invention is not limited to the embodiments in the specification.

Signal coverage and power saving are significant to the wireless communication device. If the receiving capability is improved, the wireless communication device may achieve better power saving performance (e.g., by closing the receiver and/or decoder or even the entire system early) or have a larger signal coverage (i.e., the wireless communication device can still successfully receive the data when the signal is poor) than other devices under the same signal strength and quality.

Although the channel coding technology adopted by the wireless communication system and the decoder used by the terminal device have their theoretical and practical limits, if a part of the data to be received can be known in advance, the decoding performance can be effectively improved. In general, wireless communication applications designed for humans are not easy to predict effectively because the data transmitted and received is more diverse, and messages belonging to various applications tend to be interleaved (for example, multiple applications on the terminal device are transmitting data at the same time). However, the contents and patterns of message exchange in the IoT tend to be monotonous (such as a tracker reporting position, a meter reporting readings on a regular basis), making predictions feasible and easy. Based on the predictability of IoT communications, the present invention provides a predictive decoding technique that can predict part or all of the data and applies the predictive decoding technique to the data receiving processing having the error detection capability, so as to improve data receiving performance. The types of error detection include, for example, cyclic redundancy checks (CRC), checksum, parity bits, and/or error correcting code (ECC). Referring to en.wikipedia.org/wiki/Error_detection_and_correction#Error_detection_schemes for more information about error detection.

Figure 2:
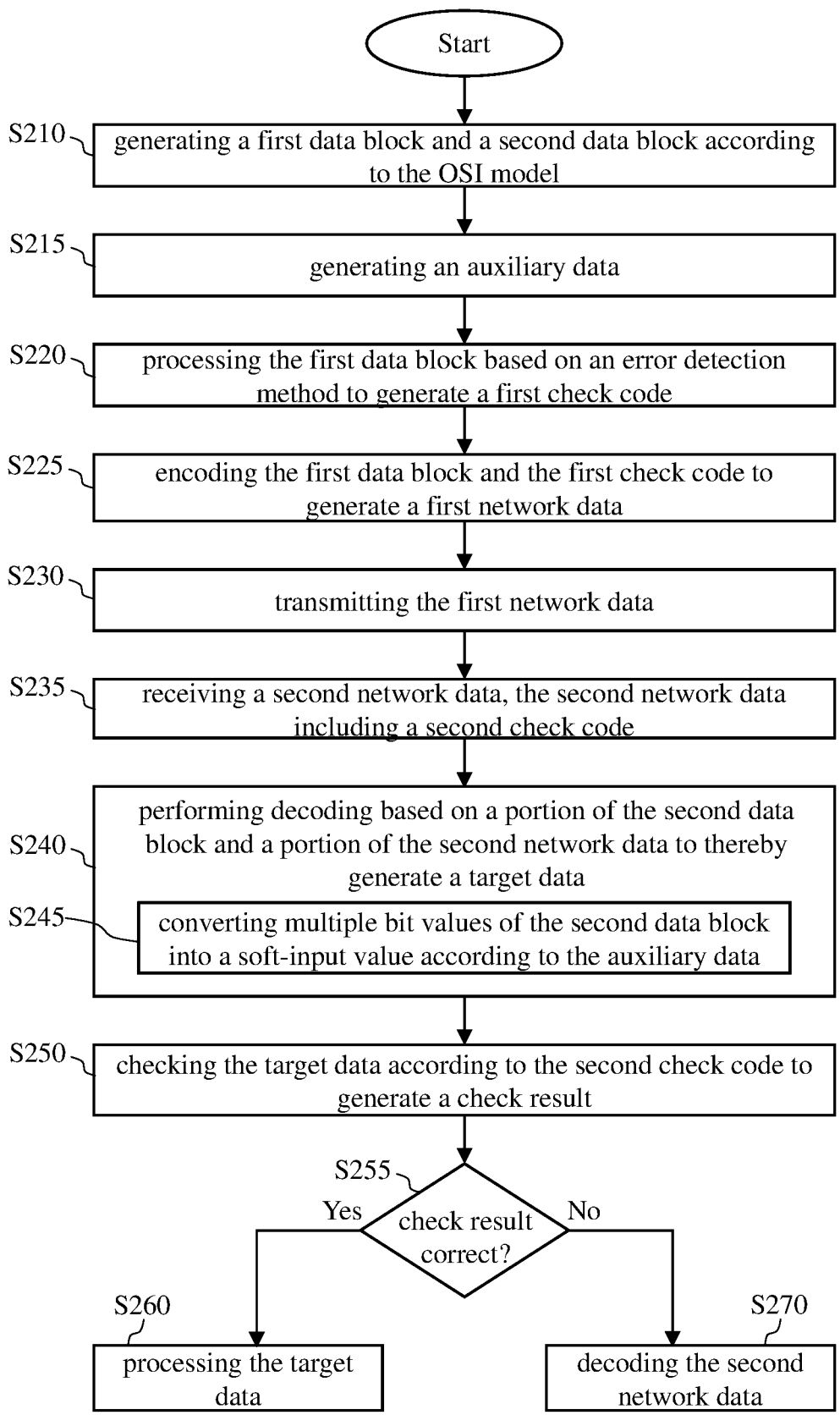
FIG. 2 illustrates a flowchart of a network data processing method according to an embodiment of the present invention.

FIG. 1 is a functional block diagram of a network data processing device according to an embodiment of the present invention, and FIG. 2 is a flowchart of a network data processing method according to an embodiment of the present invention. Reference is made to both FIGS. 1 and 2. The network data processing device 100 includes a data processing circuit 110, an error detection data generating circuit 120, an encoding circuit 130, a data transceiving circuit 140, and a decoding circuit 150. The data processing circuit 110 generates a first data block and a second data block according to the Open Systems Interconnection model (OSI model) (step S210). The first data block is data to be transmitted to a target network device, and the second data block is predicted data. The second data block includes at least one predicted bit, and the predicted bit is determined according to the first data block. The data processing circuit 110 further generates an auxiliary data (step S215). The auxiliary data indicates whether the bit(s) in the second data block is(are) predicted bit(s); in other words, the auxiliary data can indicate the credibility of the bits in the second data block. Details of how the data processing circuit 110 generates the second data block and the auxiliary data will be discussed later. The error detection data generating circuit 120 processes the first data block based on an error detection method to generate a first check code (step S220). For example, the detection method may be the CRC, and the generated first check code may be used for detecting errors in the first data block. The encoding circuit 130 encodes the first data block and the first check code to generate a first network data (step S225). The data transceiving circuit 140 transmits the first network data to the target network device through the networks (step S230). The data transceiving circuit 140 also receives the second network data from the target network device. The second network data is a response of the target network device to the first network data, and the second network data includes a second check code (step S235).

The decoding circuit 150 performs decoding based on a portion of the second data block and a portion of the second network data to thereby generate a target data (step S240). More specifically, the network data processing device 100 makes a prediction on the second network data, and the second data block is a prediction of the second network data. The higher the accuracy of the prediction, the higher the similarity between the second data block and the second network data. When performs decoding, the decoding circuit 150 may refer to the second network data to obtain an unpredicted portion of the second data block. For example, the decoding circuit 150 may perform decoding after (1) replacing the unpredicted bits of the second data block with corresponding bit values in the second network data; or (2) mixing the second network data and the predicted portion of the second data block. The decoding circuit 150 is mainly formed by a channel decoder capable of receiving soft inputs and may include, but not limited to, an iterative decoder. When the decoding circuit 150 is implemented by the iterative decoder, the second network data is used as the input data, and the second data block is used as the previous decoding result, but only one decoding operation is performed (i.e., no iteration), and it is not required to generate a soft-output value.

The decoding circuit 150 includes a soft-input channel decoder 152 and an error detection circuit 154. The soft-input channel decoder 152 processes the soft-input values; therefore, step S240 includes sub-step S245: before decoding, the soft-input channel decoder 152 converts multiple bit values of the second data block into a soft-input value according to the auxiliary data. For example, the auxiliary data may be a mask having the same number of bits as the second data block, and uses a logic 0 to indicate that the corresponding bit in the second data block is an unpredicted bit and uses a logic 1 to indicate that the corresponding bit in the second data block is a predicted bit. If, for example, the auxiliary data is (1101110) (the third and seventh bits are unpredicted bits, while others are predicted bits), and the second data block is (1001100), the soft-input channel decoder 152 can obtain the soft input of (+1, −1, 0, +1, +1, −1, 0) according to the auxiliary data and the second data block.

After the target data is generated in step S240, the error detection circuit 154 checks the target data according to the second check code to thereby generate a check result (step S250). If the prediction of the second data block is correct, the check result should be correct. When the check result is correct (step S255 is positive), the decoding circuit 150 transmits the target data to the data processing circuit 110 for subsequent processing (step S260). When the check result is incorrect (step S255 is negative), the decoding circuit 150 may try to decode the second data block if there is still any second data block remained, or, if there is no remaining second data block, decode the second network data (step S270) and then transmit the target data obtained by decoding the second network data to the data processing circuit 110 for subsequent processing.

The above-discussed data block refers to a data unit that can be appended with error detection information/data and then channel coded. For the NB-IoT, a data block is a transport block. For the IoT standard of Long Range Wide Area Network (LoRaWAN), a data block refers to a payload of a physical layer.

Figure 3:
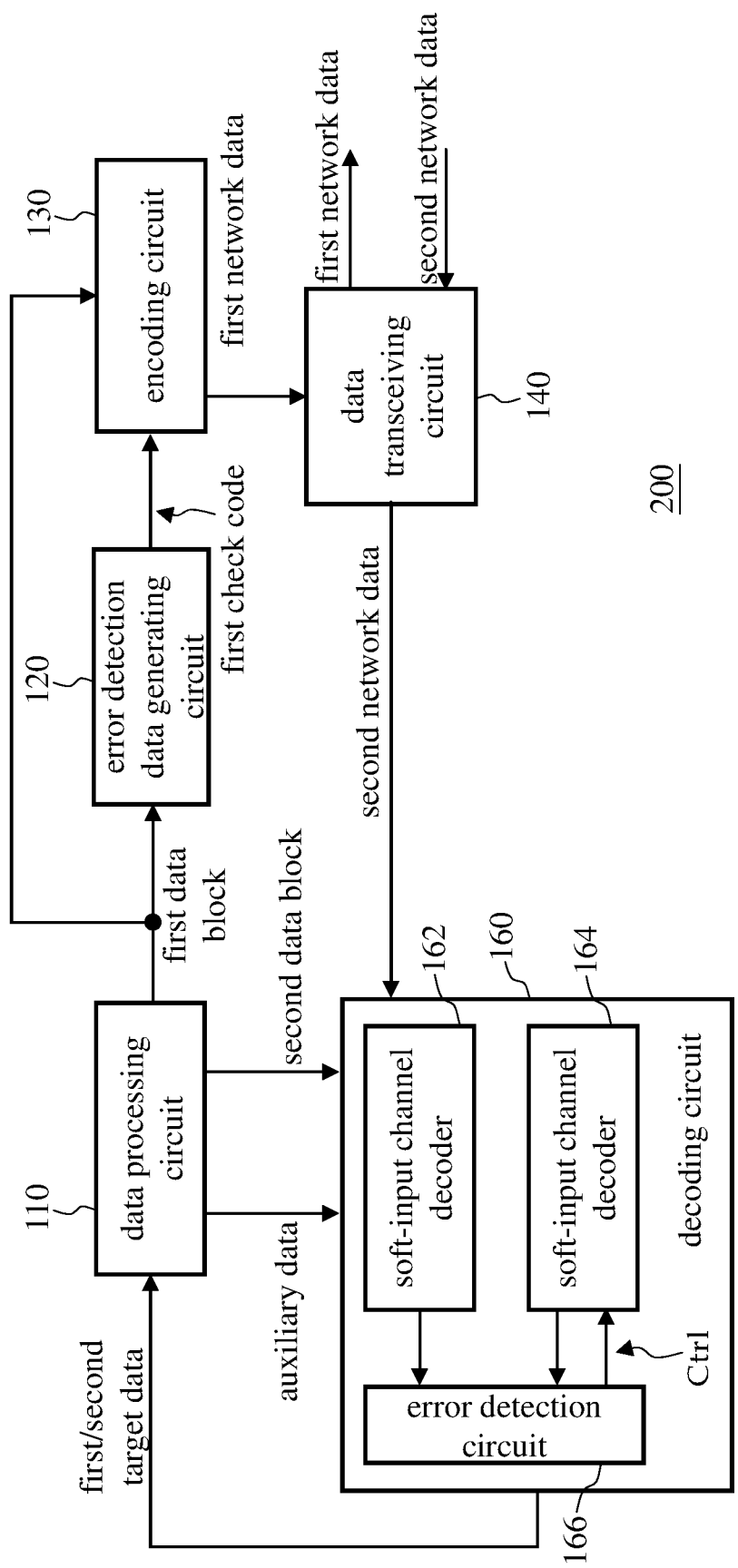
FIG. 3 illustrates a functional block diagram of a network data processing device according to another embodiment of the present invention.
Figure 4:
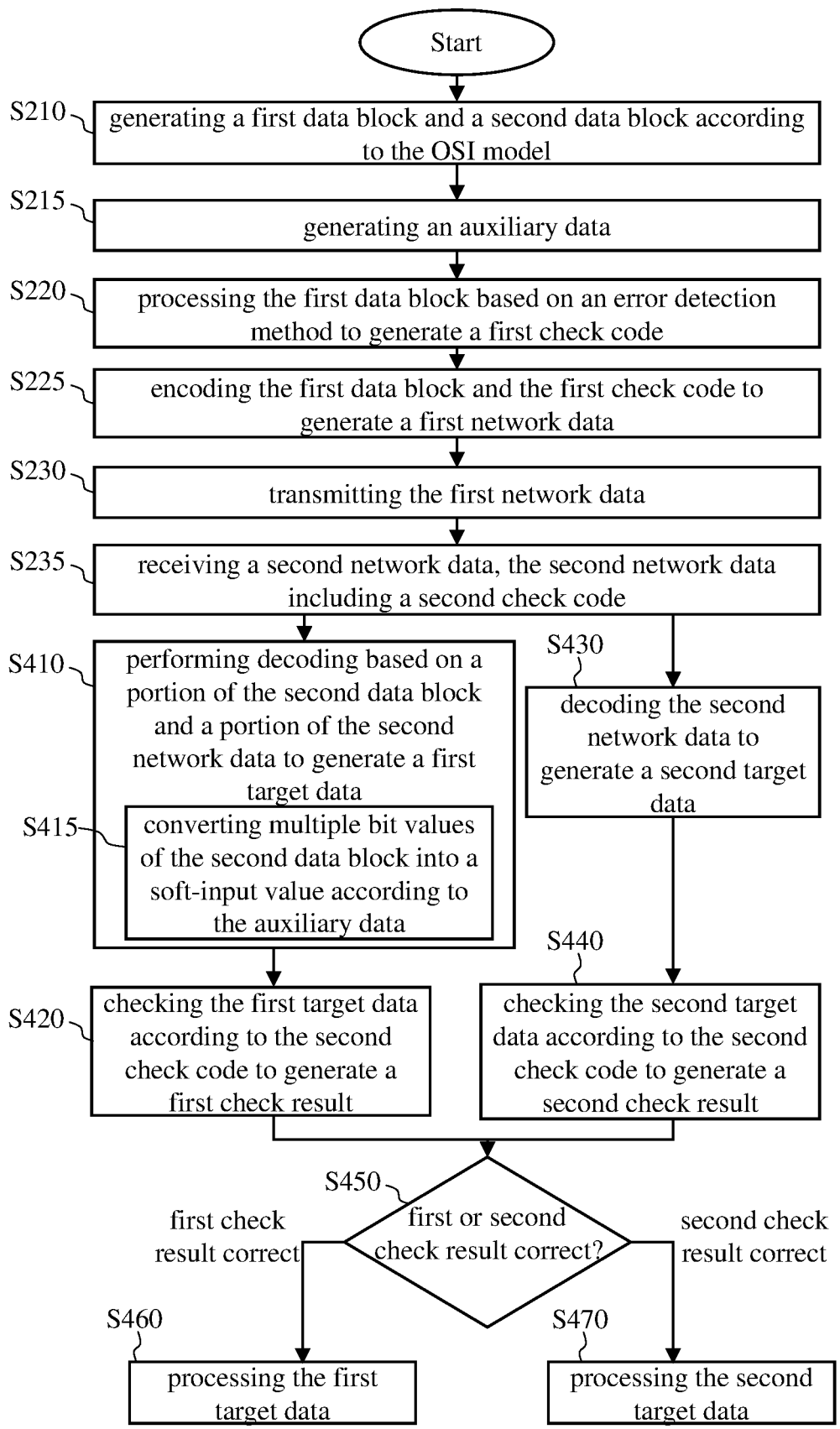
FIG. 4 illustrates a flowchart of a network data processing method according to another embodiment of the present invention.

FIG. 3 is a functional block diagram of a network data processing device according to another embodiment of the present invention, and FIG. 4 is a flowchart of a network data processing method according to another embodiment of the present invention. Reference is made to both FIGS. 3 and 4. The network data processing device 200 includes the data processing circuit 110, the error detection data generating circuit 120, the encoding circuit 130, the data transceiving circuit 140, and the decoding circuit 160. The data processing circuit 110, the error detection data generating circuit 120, the encoding circuit 130, the data transceiving circuit 140 in FIG. 3 and steps S210 to S235 in FIG. 4 have been discussed above, and the repeated descriptions are thus omitted for brevity. The decoding circuit 160 is mainly formed by a channel decoder capable of receiving soft inputs and may include, but not limited to, an iterative decoder.

The decoding circuit 160 includes a soft-input channel decoder 162, a soft-input channel decoder 164, and an error detection circuit 166. The soft-input channel decoder 162 performs steps S410 and S415 to generate a first target data. Steps S410 and S415 are similar to steps S240 and S245, respectively; therefore, the details are omitted for brevity. Next, the error detection circuit 166 checks the first target data according to the second check code to thereby generate a first check result (step S420). The soft-input channel decoder 164 decodes the second network data to generate a second target data (step S430), and the error detection circuit 166 checks the second target data according to the second check code to thereby generate a second check result (Step S440).

In the embodiment shown in FIG. 4, the soft-input channel decoder 162 and the soft-input channel decoder 164 operate in parallel, that is, step S410 (including sub-step S415) and step S430 can be performed simultaneously. When one of the soft-input channel decoders 162 and 164 fails to decode successfully or correctly, the target data generated by the other can be used as a backup, so that the processing speed of the network data processing device 200 can be increased. However, in other embodiments, the soft-input channel decoder 164 selectively performs step S430 according to the first check result. More specifically, when the first check result is incorrect, the error detection circuit 166 issues the control signal Ctrl to control the soft-input channel decoder 164 to perform step S430; when, on the other hand, the first check result is correct, the soft-input channel decoder 164 does not perform step S430.

Next, the error detection circuit 166 determines whether the first or second check result is correct (step S450). When the first check result is correct, the error detection circuit 166 outputs the first target data to the data processing circuit 110 for subsequent processing (step S460). When the second check result is correct, the error detection circuit 166 outputs the second target data to the data processing circuit 110 for subsequent processing (step S470).

For the network data processing device 100 (or 200), the use of the predicted data in the decoding process may early terminate the decoding process (for example, no need to wait for the complete second network data to be received), so that the network data processing device 100 (or 200) can turn off the decoding circuit 150 (or 160) and/or the data transceiving circuit 140 early to reduce power consumption. Moreover, it is also helpful to improve decoding performance if the network data processing device 100 (or 200) knows in advance part of the second network data. For example, suppose the transmitting end is to transmit a 16-bit data and encodes the data into a 24-bit data using a ⅔ convolutional code, when the network data processing device 100 (or 200) can know in advance four bits of the 16-bit data, it turns out to be equivalent to transmitting a 12-bit data with 24 coded bits. In other words, the code rate is changed from ⅔ to ½, which can significantly improve decoding performance.

Figure 5:
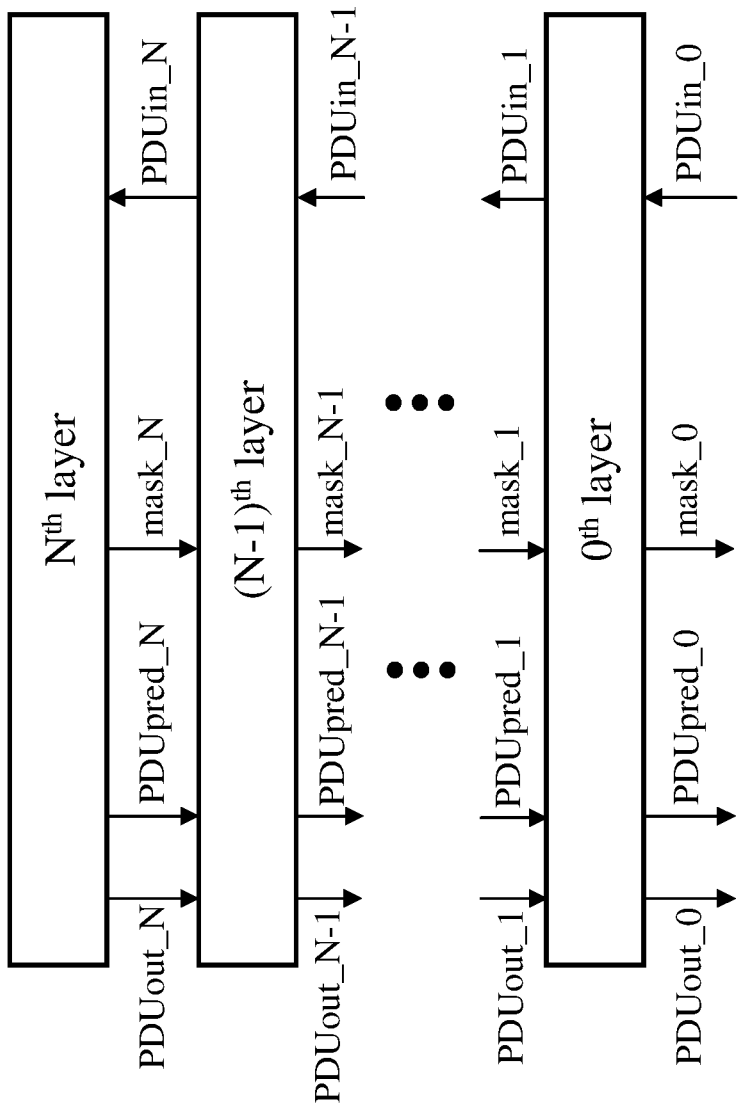
FIG. 5 illustrates a schematic diagram of an Open Systems Interconnection model (OSI model).

FIG. 5 is a schematic diagram of the OSI model. As shown in FIG. 5, the data processing circuit 110 includes N abstraction layers. For the OSI model, N is typically six, and the $0^{th}$ abstraction layer to the $6^{th}$ abstraction layer are sequentially the Physical Layer, the Data Link Layer, the Network Layer, the Transport Layer, the Session Layer, the Presentation Layer, and the Application Layer. When receiving data, the $0^{th}$ abstraction layer receives the data PDUin_0, processes the data PDUin_0 (e.g., removes the header), extracts the data that can be processed by the $0^{th}$ abstraction layer itself, and transmits remaining data (i.e., the data PDUin_1) to the $1^{st}$ layer (not shown). Similarly, the $(N-1)^{th}$ abstraction layer receives the data PDUin_N−1 from the $(N-2)^{th}$ abstraction layer (not shown), removes the header, extracts the data corresponding to the $(N-1)^{th}$ abstraction layer itself, and then transmits the data PDUin_N to the $N^{th}$ abstraction layer. The operation of transmitting data is generally the reverse operation of receiving data and is well known to those of ordinary skill in the art; thus, the details are omitted for brevity.

Figure 6:
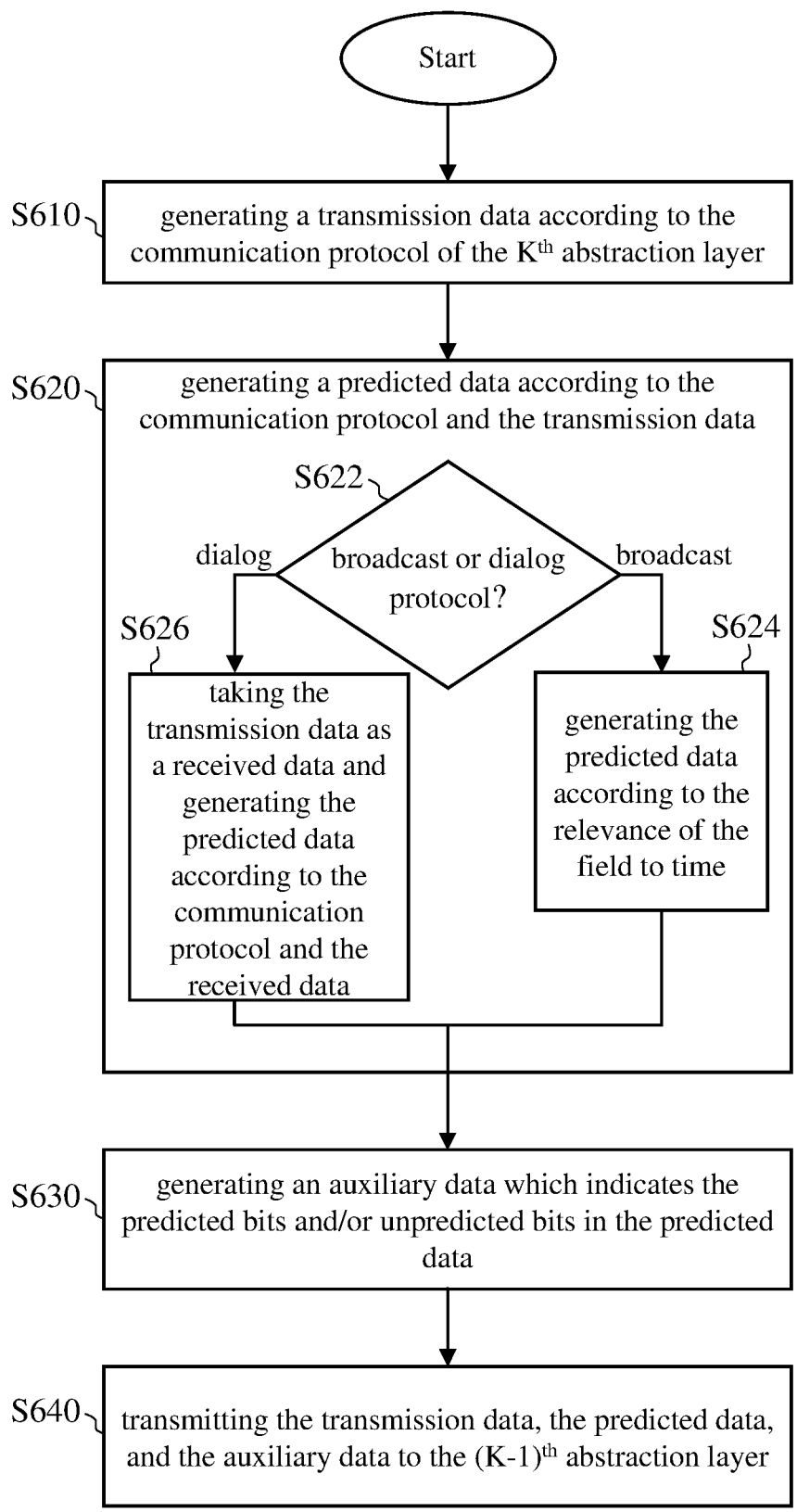
FIG. 6 illustrates a flowchart of a network data prediction method according to an embodiment of the present invention.

FIG. 6 is a flowchart of a network data prediction method according to an embodiment of the present invention. First, the $K^{th}$ abstraction layer generates a transmission data PDUout_K according to the communication protocol of the $K^{th}$ abstraction layer (step S610) ($0 \leq K \leq N$). The transmission data PDUout_K can be processed by a peer abstraction layer of the target network device that communicates with the network data processing device 100 (or 200), that is, the peer abstraction layer and the $K^{th}$ abstraction layer are corresponding abstraction layers, both obeying the same communication protocol. The $K^{th}$ abstraction layer further generates a predicted data PDUpred_K according to the communication protocol of the $K^{th}$ abstraction layer and the transmission data PDUout_K (step S620), and the predicted data PDUpred_K is associated with the transmission data PDUout_K. More specifically, because the $K^{th}$ abstraction layer and its peer abstraction layer of the target network device obey the same communication protocol, the $K^{th}$ abstraction layer can make a prediction, by the simulating the peer abstraction layer, on the response data that the peer abstraction layer will generate when receiving the transmission data PDUout_K. In other words, the $K^{th}$ abstraction layer takes the transmission data PDUout_K as a received data and generates the predicted data PDUpred_K according to the transmission data PDUout_K and the communication protocol that the $K^{th}$ abstraction layer obeys. Except for the $0^{th}$ layer, each abstraction layer uses the service of their underlying layer to communicate with their peer abstraction layer.

The data processing circuit 110 predicts some or all of the bits of the predicted data PDUpred_K according to the properties of the transmission data PDUout_K. More specifically, step S620 includes sub-steps S622-S626. The $K^{th}$ abstraction layer first determines whether the transmission data PDUout_K conforms to a broadcast protocol or a dialog protocol (step S622). In the case of a broadcast protocol, the $K^{th}$ abstraction layer generates the predicted data according to the relevance of the field of the response data to time (step S624). In the case of a dialog protocol, the $K^{th}$ abstraction layer takes the transmission data as a received data and generates the predicted data according to the communication protocol and the received data (step S626). Steps S624 and S626 will be discussed in detail below.

In some embodiments, the $K^{th}$ abstraction layer further generates an auxiliary data mask_K, which indicates the predicted bits and/or unpredicted bits in the predicted data PDUpred_K (step S630). For details of the auxiliary data, please refer to the above-discussed examples. If the predicted data PDUpred_K is longer in length than the predicted data PDUpred_K+1 by Q bits, then the auxiliary data mask_K is longer in length than the auxiliary data mask_K+1 by Q bits.

Finally, the $K^{th}$ abstraction layer transmits the transmission data PDUout_K, the predicted data PDUpred_K, and the auxiliary data mask_K to the $(K-1)^{th}$ abstraction layer (step S640). The data PDUin_K, the transmission data PDUout_K, and the predicted data PDUpred_K can all be regarded as a protocol data unit (PDU). The transmission data PDUout_0 and the predicted data PDUpred_0 are respectively the first data block and the second data block generated by the data processing circuit 110.

Figure 7:
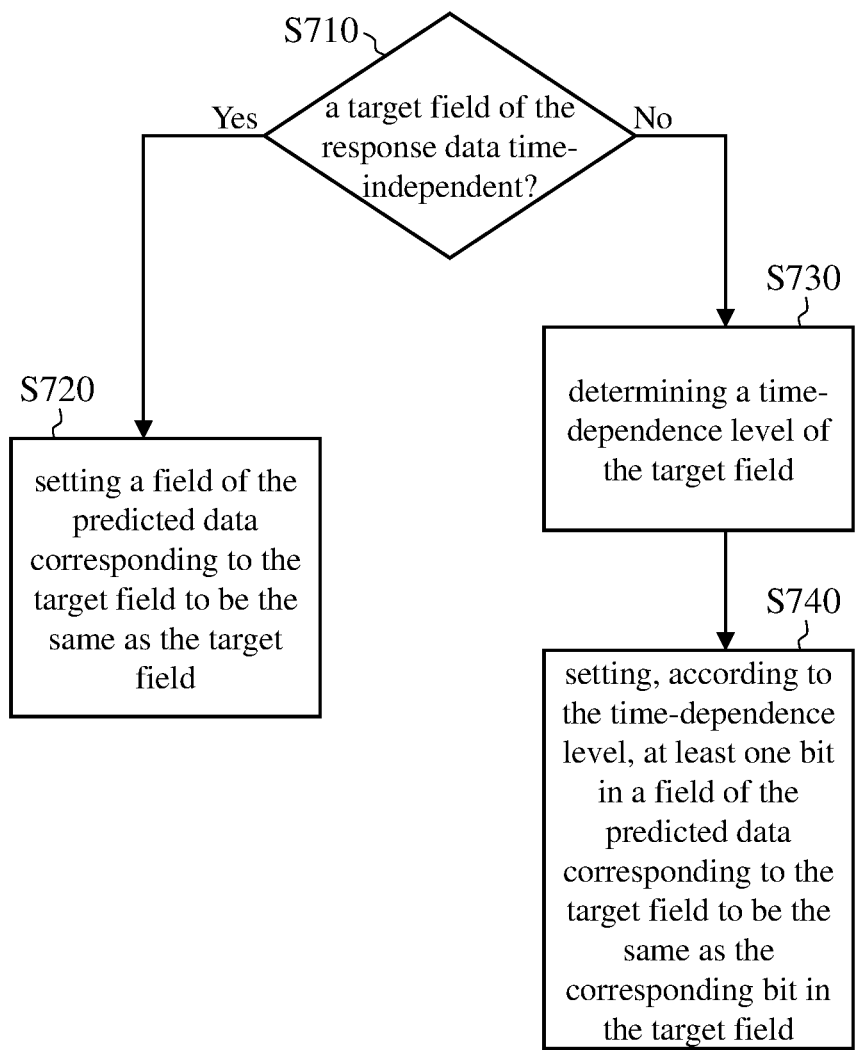
FIG. 7 illustrates a detailed flow of step S624 of FIG. 6.

FIG. 7 is a detailed flow of step S624. It is assumed that the $K^{th}$ abstraction layer has generated a previous transmission data based on the broadcast protocol before generating the transmission data PDUout_K, and the peer abstraction layer of the target network device generates the data PDUin_K in response to the previous transmission data, that is, the data PDUin_K is the response data based on the broadcast protocol. Since the transmission data PDUout_K conforms to the broadcast protocol, the time-independent field of the response data PDUin_K' in response to the transmission data PDUout_K is basically the same as the corresponding field of the data PDUin_K; therefore, the $K^{th}$ abstraction layer can determine how to generate the predicted data PDUpred_K based on the properties of the field.

The response data PDUin_K and the response data PDUin_K' both contain multiple fields. The $K^{th}$ abstraction layer first determines whether or not a target field of the response data PDUin_K is time-independent (step S710). If positive, the $K^{th}$ abstraction layer sets a field of the predicted data PDUpred_K corresponding to the target field to be the same as the target field. In other words, the $K^{th}$ abstraction layer can set multiple bits in the time-independent field of the predicted data PDUpred_K to be the same as the multiple bits in the corresponding field (e.g., the target field) of the data PDUin_K (step S720). If the result of step S710 is negative, the $K^{th}$ abstraction layer determines a time-dependence level of the target field (step S730), and then sets, according to the time-dependence level, at least one bit in a field of the predicted data PDUpred_K corresponding to the target field to be the same as the corresponding bit in the target field (step S740). For example, if more bits in the target field are time dependent, then the time-dependence level of the target field is higher; if fewer bits in the target field are time dependent, then the time-dependence level of the target field is lower. A higher (lower) time-dependence level indicates that more (fewer) bits in the field of the predicted data PDUpred_K are set by the $K^{th}$ abstraction layer to be the same as the corresponding bits in the target field.

As shown in FIG. 7, when making a prediction on a network data conforming to the broadcast protocol, the $K^{th}$ abstraction layer can make the prediction on an entire field according to the level of dependence between the field and time (step S720), or only make the prediction on certain bits in the field. (e.g., the most significant bits (MSB)) (steps S730, S740). For example, FIG. 8 is a data structure of a broadcast packet corresponding to the Narrowband Master Information Block (MIB-NB) (MasterInformationBlock-NB) of the NB-IoT. Since systemFrameNumber-MSB-r13 and hyperSFN-LSB-r13 are time information, no prediction is made. Because systemInfoValueTag-r13 changes slowly (i.e., the time-dependence level is low), a prediction can be made that it will not change (i.e., the same as the previous response data), or only a part of its MSB is predicted. Other fields are not related to time, so they can be predicted to be the same as the previous response data.

Figure 9:
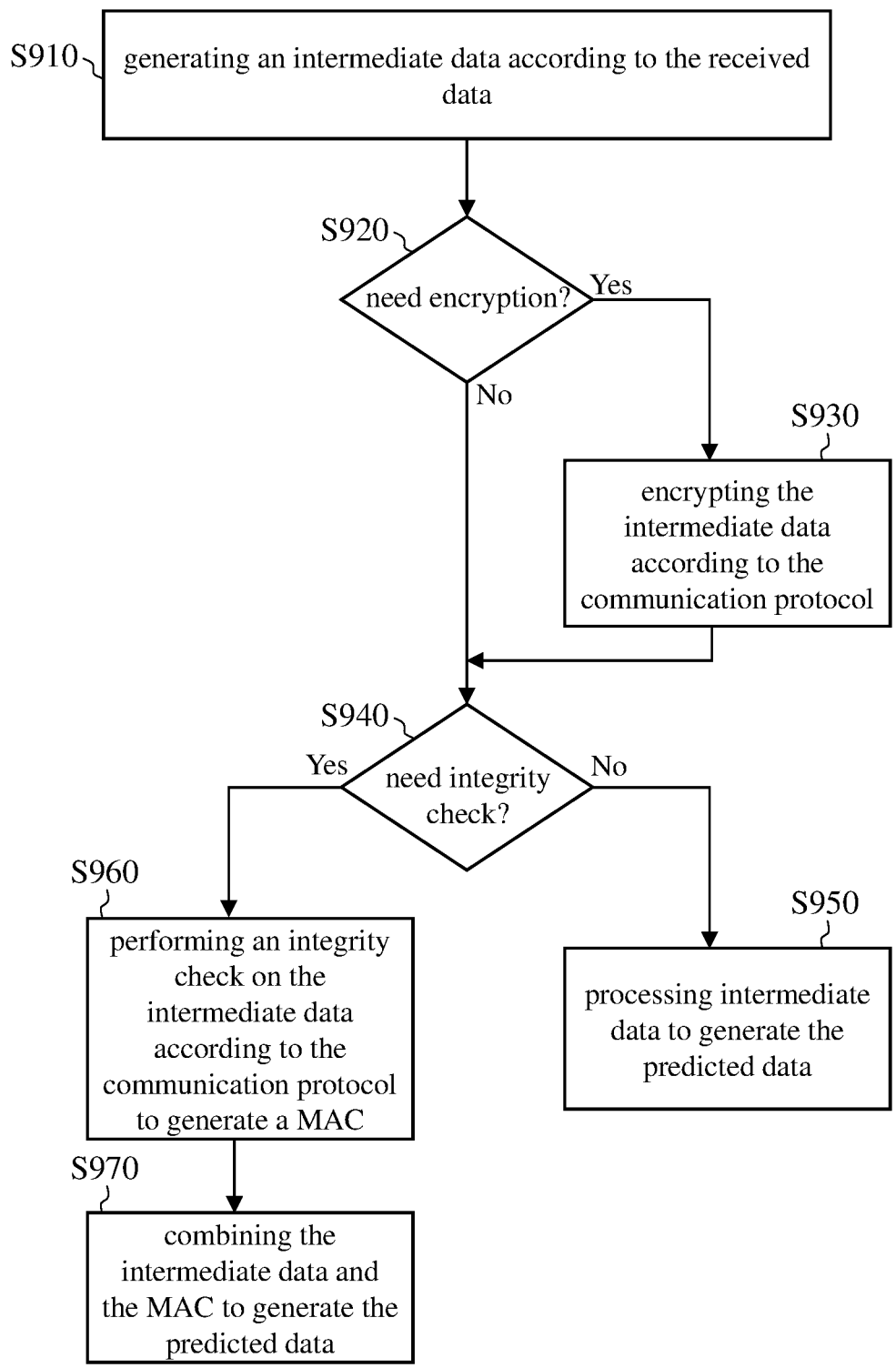
FIG. 9 illustrates a detailed flow of step S626 of FIG. 6.

FIG. 9 is a detailed flow of step S626. First, the $K^{th}$ abstraction layer generates an intermediate data according to the received data (step S910). The intermediate data is a response data that the $K^{th}$ abstraction layer generates in response to the transmission data PDUout_K, which is treated here by the $K^{th}$ abstraction layer as the received data, based on the communication protocol of the $K^{th}$ abstraction layer. In other words, the $K^{th}$ abstraction layer generates the intermediate data by playing the peer abstraction layer. Next, the $K^{th}$ abstraction layer determines whether or not to encrypt the intermediate data (step S920). More specifically, if the communication protocol of the $K^{th}$ abstraction layer includes encrypting the packet data unit, then step S920 is positive, and thus the $K^{th}$ abstraction layer encrypts the intermediate data according to the communication protocol in step S930. If no encryption is needed (step S920 is negative) or step S930 has been performed, the $K^{th}$ abstraction layer determines whether or not an integrity check is required (step S940).

Next, if the communication protocol does not include an integrity check, the $K^{th}$ abstraction layer processes (e.g., adds a header) the encrypted or unencrypted intermediate data to generate the predicted data (step S950). If the communication protocol includes an integrity check, the $K^{th}$ abstraction layer performs an integrity check on the encrypted or unencrypted intermediate data according to the communication protocol to generate a message authentication code (MAC) (Step S960) and then combines the intermediate data and the MAC to generate the predicted data (step S970). In some embodiments, step S970 includes adding a header to the combined data to generate the predicted data.

Note that when data processing is required in some steps of the flows of FIGS. 7 and 9, if the output bit(s) that is(are) dependent of some of the input bits have shared or common bit(s) with the output bit(s) that is(are) dependent of other input bits, then no prediction is made on the shared or common output bit(s); this, for example, may occur at step S960. The prediction is made if the output bit(s) dependent of any of the input bits does(do) not have shared or common bit(s) with the output bits dependent of any of other input bits.

In some embodiments, multiplexing may also be included when the $K^{th}$ abstraction layer generates the predicted data PDUpred_K. If there is more than one $(K+1)^{th}$ abstraction layer, and the peer abstraction layer performs multiplexing when transmitting the PDU, the $K^{th}$ abstraction layer may selectively perform multiplexing when generating the predicted data PDUpred_K. However, it is also a reasonable prediction if no multiplexing is performed.

Since a person having ordinary skill in the art can appreciate the implementation detail and the modification thereto of the present method invention through the disclosure of the device invention, repeated and redundant description is thus omitted. Please note that there is no step sequence limitation for the method inventions as long as the execution of each step is applicable. Furthermore, the shape, size, and ratio of any element and the step sequence of any flow chart in the disclosed figures are exemplary for understanding, not for limiting the scope of this invention. Although the foregoing embodiments are exemplified by, but not limited to, a NB-IoT, those skilled in the art can appropriately apply the present invention to other types of IoT, such as Long-Range Internet of Things (LoRa-IoT) according to the disclosure of the present invention.

The aforementioned descriptions represent merely the preferred embodiments of the present invention, without any intention to limit the scope of the present invention thereto. Various equivalent changes, alterations, or modifications based on the claims of the present invention are all consequently viewed as being embraced by the scope of the present invention.

What is claimed is:

1. A network data prediction method carried out by a device that implements an Open Systems Interconnection model (OSI model), wherein the device communicates with a target network device that implements the OSI model that includes a target abstraction layer that obeys a communication protocol, the method comprising following steps:
generating, by the device according to the communication protocol of the target abstraction layer of the OSI model of the target network device, in a K-th abstraction layer of the OSI model of the device a transmission data that is to be transmitted to the target network device and can be processed by the target abstraction layer of the OSI model of the target network device, wherein K is an integer greater than zero and the K-th abstraction layer of the OSI model of the device corresponds to the target abstraction layer of the OSI model of the target network device and obeys the communication protocol of the target abstraction layer of the OSI model of the target network device;
generating, by the device, in the K-th abstraction layer of the OSI model of the device a predicted data according to the transmission data and the communication protocol of the target abstraction layer of the OSI model of the target network device;
generating, by the device, in a 0-th abstraction layer of the OSI model of the device a data block that is a prediction of a network data according to the transmission data and the predicted data; and
receiving, by the device, at least a part of the network data from the target network device.

2. The method of claim 1, wherein the transmission data is a first transmission data and conforms to a broadcast protocol, and the device has generated a second transmission data conforming to the broadcast protocol prior to generating the first transmission data, and the target network device generates a response data in response to the second transmission data, the response data comprises a plurality of fields, the step of generating the predicted data according to the transmission data and the communication protocol of the target abstraction layer of the OSI model of the target network device comprising:
setting a plurality of bits in a first field of the predicted data to be the same as a plurality of bits in a second field that is one of the fields of the response data, is time-independent, and corresponds to the first field of the predicted data.

3. The method of claim 1, wherein the transmission data is a first transmission data and conforms to a broadcast protocol, and the device has generated a second transmission data conforming to the broadcast protocol prior to generating the first transmission data, and the target network device generates a response data in response to the second transmission data, the response data comprises a plurality of fields, the step of generating the predicted data according to the transmission data and the communication protocol of the target abstraction layer of the OSI model of the target network device comprising:
determining a time-dependence level of a target field of the response data; and
setting, according to the time-dependence level, at least one bit in a field of the predicted data corresponding to the target field to be the same as a corresponding bit in the target field.

4. The method of claim 1, wherein the transmission data conforms to a dialog protocol, and the step of generating the predicted data according to the transmission data and the communication protocol of the target abstraction layer of the OSI model of the target network device comprising:
treating the transmission data as a received data and generating the predicted data according to the communication protocol and the received data.

5. The method of claim 4, wherein the step of generating the predicted data according to the transmission data and the communication protocol of the target abstraction layer of the OSI model of the target network device further comprises:
generating an intermediate data according to the received data; and
encrypting the intermediate data according to the communication protocol.

6. The method of claim 4, wherein the step of generating the predicted data according to the transmission data and the communication protocol of the target abstraction layer of the OSI model of the target network device further comprises:
generating an intermediate data according to the received data;
performing an integrity check on the intermediate data according to the communication protocol to generate a message authentication code; and combining the intermediate data and the message authentication code to generate the predicted data.

7. The method of claim 1, wherein the predicted data comprises a plurality of predicted bits and a plurality of unpredicted bits, the method further comprising:
generating an auxiliary data indicating the predicted bits of the predicted data, the unpredicted bits of the predicted data, or both the predicted bits of the predicted data and the unpredicted bits of the predicted data.

8. The method of claim 7, wherein the auxiliary data has the same number of bits as the predicted data, and each bit of the auxiliary data indicates whether a corresponding bit in the predicted data is a predicted bit or an unpredicted bit.

* * * * *